B. H. NORTON.
SPOKE FOR VEHICLE WHEELS.
APPLICATION FILED OCT. 27, 1911. RENEWED SEPT. 20, 1912.
1,043,346.
Patented Nov. 5, 1912.
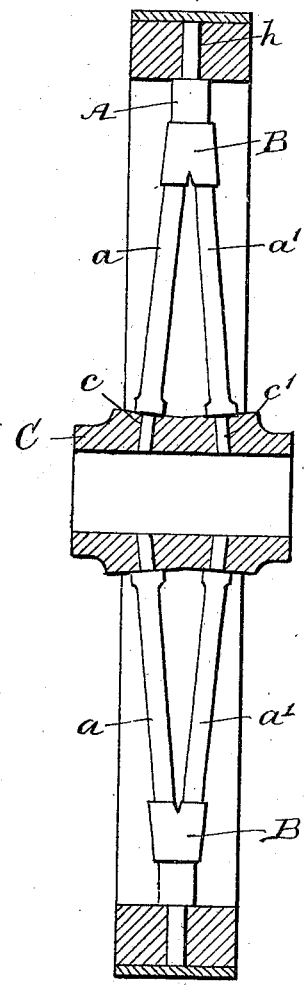
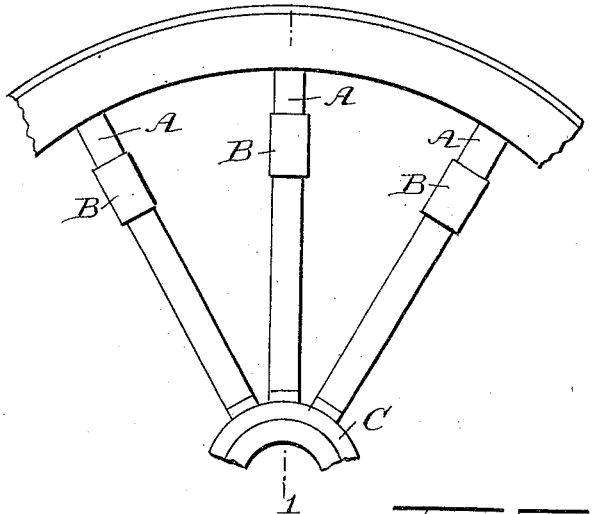
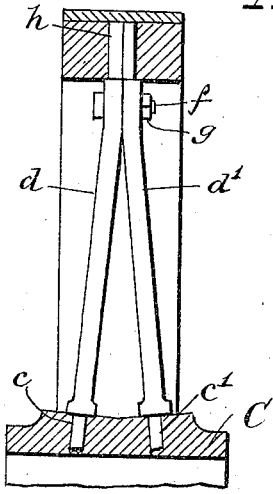
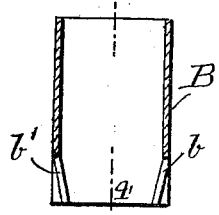
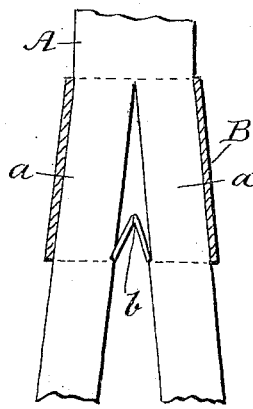
WITNESSES:
S. A. Valentine
B. M. Bennett
INVENTOR
Britton H. Norton
BY
F. N. Gilbert
ATTORNEY

UNITED STATES PATENT OFFICE.

BRITTON H. NORTON, OF BENNETTSVILLE, NEW YORK.

SPOKE FOR VEHICLE-WHEELS.

1,043,346.  Specification of Letters Patent.  Patented Nov. 5, 1912.

Application filed October 27, 1911, Serial No. 657,048. Renewed September 20, 1912. Serial No. 721,517.

*To all whom it may concern:*

Be it known that I, BRITTON H. NORTON, a citizen of the United States, residing at Bennettsville, in the county of Chenango and State of New York, have invented certain new and useful Improvements in Spokes for Vehicle-Wheels, of which the following is a specification.

My invention relates to an improvement in spokes for vehicle wheels and has for its object to provide a strong and light split or divided spoke mounted in a braced position in a hub for vehicle wheels, and which will give much greater strength than that possessed by ordinary wheels, and at the same time be light and firm.

With this object in view, my invention consists in certain novel features of construction and arrangement of parts as will be hereinafter fully described and pointed out in the claim, reference being had to the accompanying drawings, in which—

Figure 1 is a vertical section taken on line 1. 1 of Fig. 2. Fig. 2 is a fragmentary side elevation. Fig. 3 is a detailed vertical section of the ferrule. Fig. 4 is a vertical section of the same taken on the line 4. 4 of Fig. 3 and showing part of a split spoke in position and Fig. 5 is a vertical section of a modified form of my invention.

The same reference characters denote like parts in each of the several figures of the drawing.

In carrying out my invention, I provide a spoke A which is split or divided at a distance from the tip into two legs $a$, $a'$. On the spokes I mount the ferrule B. This ferrule has in it the indentations $b$, $b'$ which cause it to closely hug or gain into the divided spoke A, and braces and strengthens the spoke at the crotch or division of the legs. I provide a hub C having a raised or reinforced portion surrounding said hub, the faces of which conform to a line at right angles with the vertical line of the legs. Into this hub are inlet the spoke holes $c$, $c'$ in a diagonal direction and at right angles with the sloping surface of the hollow surrounding the hub. Into these the spoke legs $a$, $a'$ are inserted.

In a modified form of my device, as shown in Fig. 5, I have a divided spoke composed of two separate legs, $d$, $d'$, the upper portion forming a vertical position or extension, and the legs $d$, $d'$ of the lower portion being bent outward.

On a line between the two legs and in the vertical portion of the same I form rivet or bolt holes, and into these I insert the bolt $f$, having the nut $g$, and by this means they are firmly held together. The bent portion forms the legs $d$, $d'$ and enters the hub C in a diagonal position forming a braced connection therewith. The upper portion of the spoke, both in the preferred and modified forms, enters the rim of the wheel in the hole $h$.

Having thus described my invention, what I claim as new and for which I desire Letters Patent is as follows:

The combination with a spoke divided at one end to form a pair of divergent legs, of a ferrule embracing the legs at their point of union with the spoke, said ferrule consisting of a cylindrical piece of material tapering as it approaches the other end of the spoke and having a pair of V-shaped indentations disposed centrally thereof and between the divergent legs at their point of union with the spoke.

In testimony whereof I have affixed my signature in presence of two witnesses.

BRITTON H. NORTON.

Witnesses:
S. A. VALENTINE,
LOUIS H. FOOTE.